(12) United States Patent
Park et al.

(10) Patent No.: US 10,474,963 B1
(45) Date of Patent: Nov. 12, 2019

(54) NETWORK-BASED ORGANIZATION CLASSIFICATION

(71) Applicant: HRL Laboratories, LLC, Malibu, CA (US)

(72) Inventors: Patrick Park, Ithaca, NY (US); Ryan F. Compton, New York, NY (US); Tsai-Ching Lu, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 826 days.

(21) Appl. No.: 15/006,780

(22) Filed: Jan. 26, 2016

Related U.S. Application Data

(60) Provisional application No. 62/107,836, filed on Jan. 26, 2015.

(51) Int. Cl.
*G06N 20/00* (2019.01)
*G06Q 50/00* (2012.01)

(52) U.S. Cl.
CPC ............. *G06N 20/00* (2019.01); *G06Q 50/01* (2013.01)

(58) Field of Classification Search
None
See application file for complete search history.

(56) References Cited

U.S. PATENT DOCUMENTS

| | | | |
|---|---|---|---|
| 9,641,556 B1* | 5/2017 | Potter | H04L 65/10 |
| 2014/0089240 A1* | 3/2014 | Adibi | G06Q 30/02 706/13 |
| 2015/0120717 A1* | 4/2015 | Kim | G06F 17/30699 707/727 |
| 2015/0178372 A1* | 6/2015 | Seal | G06F 17/30734 707/737 |
| 2016/0071162 A1* | 3/2016 | Ogawa | G06Q 30/0269 705/14.66 |

OTHER PUBLICATIONS

Yin, Peifeng, Nilam Ram, Wang-Chien Lee, Conrad Tucker, Shashank Khandelwal, and Marcel Salathé. "Two sides of a coin: Separating personal communication and public dissemination accounts in Twitter." In Pacific-Asia Conference on Knowledge Discovery and Data Mining, pp. 163-175. Springer, Cham, 2014. (Year: 2.*

(Continued)

*Primary Examiner* — Scott A. Waldron
*Assistant Examiner* — Casey R. Garner
(74) *Attorney, Agent, or Firm* — Tope-McKay & Associates (57) ABSTRACT

Described is a system for discriminating between individual accounts and organization accounts in a social media network. The system processes data from a social media network comprising a set of user accounts. A directed mention network, a bi-directed mention network, and a set of computer-observable network metrics are generated. A classification model is trained using the set of computer-observable network metrics and a set of ground-truth user accounts. The trained classification model is used to classify each user account in the set of user accounts as an individual account or an organization account, resulting in a set of classified user accounts.

12 Claims, 8 Drawing Sheets

(56) References Cited

OTHER PUBLICATIONS

Sousa, Daniel, Luís Sarmento, and Eduarda Mendes Rodrigues. "Characterization of the twitter@ replies network: are user ties social or topical?." In Proceedings of the 2nd international workshop on Search and mining user-generated contents, pp. 63-70. ACM, 2010. (Year: 2010).*

Uddin, Muhammad Moeen, Muhammad Imran, and Hassan Sajjad. "Understanding types of users on Twitter." arXiv preprint arXiv:1406.1335 (2014). (Year: 2014).*

Jurgens, David. "That's what friends are for: Inferring location in online social media platforms based on social relationships." In Seventh International AAAI Conference on Weblogs and Social Media. 2013. (Year: 2013).*

Messarra, Nasri. "NODEXL for Beginners." http://nasri.messarra.com/wp-content/uploads/2014/12/nodexl.pdf (retrieved Mar. 27, 2019) (Year: 2014).*

Anger, Isabel, and Christian Kittl. "Measuring influence on Twitter." In Proceedings of the 11th International Conference on Knowledge Management and Knowledge Technologies, p. 31. ACM, 2011. (Year: 2011).*

Van der Maaten, L., Hinton, G. 2008. Visualizing Data using t-SNE. Journal of Machine Learning Research 9, pp. 2579-2605.

Page, L., Brin, S., Motwani, R., Winograd, T. 1999. The PageRank citation ranking: Bringing order to the Web. , published as a technical report on Jan. 29, 1998, pp. 1-17.

Wu, S., J. Hofman, W. Mason, and D. Watts 2011. "Who Says What to Whom on Twitter." WWW 2011—Session: Diffusion, pp. 705-714.

Sharma N. S. Ghosh, F. Benevenuto, N. Ganguly, and K. Gummadi. 2012. "Inferring Who-is-Who in the Twitter Social Network." ACM WOSN, pp. 55-60.

Tavares, G. and A. Faisal. 2013. "Scaling-Laws of Human Broadcast Communication Enable Distinction between Human, Corporate and Robot Twitter Users." PLoS One, Jul. 2013, vol. 8, Issue 7, pp. e65774-1-e65774-11.

De Choudhury, M. N. Diakopoulos, and M. Naaman. 2012. "Unfolding the Event Landscape of Twitter: Classification and Exploration of User Categories." ACM CSCW, pp. 241-244.

De Silva, Lalindra, and Ellen Riloff. "User type classification of tweets with implications for event recognition." ACL 2014 (2014): p. 98.

Saramaki, J., E. A. Leicht, E. Lopez, S. G. B. Roberts, F. Reed-Tsochas, and R. I. M. Dunbar. 2014. "Persistence of Social Signatures in Human Communication." Proceedings of the National Academy of Sciences, pp. 942-947, Jan. 21, 2014, vol. 111, No. 3.

Honeycutt, Courtenay, and Susan C. Herring. "Beyond microblogging: Conversation and collaboration via Twitter." In System Sciences, 2009. HICSS'09. 42nd Hawaii International Conference on, pp. 1-10. IEEE, 2009.

Brewer, D.D. 1995. "The Social Structural Basis of The Organization of Persons in Memory." Human Nature 6: pp. 379-403.

DeScioli, P. and R. Kurzban. 2009. "The Alliance Hypothesis for Human Friendship." PLoS ONE, Jun. 2009, vol. 4, Issue 6, pp. e5802-1-e5802-8.

Dunbar, R.I.M. 1995. "Neocortex Size and Group Size in Primates: A Test of the Hypothesis." Journal of Human Evolution, 28: pp. 287-296.

Goode, W. J. 1960. "A Theory of Role Strain." American Sociological Review, 25(4): pp. 483-496.

Miller, G. 1956. "The Magical Seven Plus or Minus Two: Some Limits on Our Capacity for Processing Information." Psychological Review, 63: pp. 81-97.

Roberts, S., R. I. M. Dunbar, T. V. Pollet, and T. Kuppens. 2009. "Exploring Variation in Active Network Size: Constraints and Ego Characteristics." Social Networks, 31(2): pp. 138-146.

Blau, P. 1964. Exchange and Power in Social Life. John Wiley and Sons: New York, p. 352.

Park, P., Compton, R., Lu, T-C. 2015. Network-Based Group Account Classification, Behavior-Culture Modeling, and Prediction, Lecture Notes in Computer Science vol. 9021, pp. 163-172.

* cited by examiner

| | mean | std | min | 25% | 50% | 75% | max |
|---|---|---|---|---|---|---|---|
| Log( bidirected network pagerank ) | -14.23 | 1.78 | -18.61 | -15.44 | -14.36 | -13.26 | -3.08 |
| Log( directed network indegree ) | 4.03 | 1.16 | 0.00 | 3.30 | 4.04 | 4.75 | 13.96 |
| Log( directed network out- to in- degree ratio) | 0.15 | 0.44 | -9.95 | -0.04 | 0.12 | 0.32 | 5.38 |
| Log( directed network out- to in-mention ratio) | 0.12 | 0.50 | -10.37 | -0.08 | 0.09 | 0.29 | 7.36 |
| Log(bidirected network neighbor degree to self degree ratio) | 0.46 | 1.01 | -5.43 | -0.20 | 0.29 | 0.92 | 8.88 |
| Log(directed network inmention to bidirected network inmention ratio) | 0.24 | 0.33 | 0.00 | 0.08 | 0.15 | 0.27 | 12.78 |
| Log(directed network inmention to bidirected network inmention ratio)^2 | 0.16 | 1.09 | 0.00 | 0.01 | 0.02 | 0.07 | 163.23 |
| Directed network outmention gini coefficient | 0.54 | 0.14 | 0.00 | 0.46 | 0.56 | 0.64 | 0.96 |
| Directed network inmention gini coefficient | 0.54 | 0.14 | 0.00 | 0.47 | 0.56 | 0.64 | 0.96 |

NETWORK-BASED ORGANIZATION CLASSIFICATION

CROSS-REFERENCE TO RELATED APPLICATIONS

This is a Non-Provisional Application of U.S. Provisional Patent Application No. 62/107,836 filed Jan. 26, 2015, entitled, "Network-Based Organization Classification", the entirety of which is incorporated herein by reference.

BACKGROUND OF INVENTION

(1) Field of Invention

The present invention relates to a classification system for organization accounts in bi-directed networks and, more particularly, to a classification system for organization accounts in bi-directed networks based on network characteristics.

(2) Description of Related Art

Language-based classification shows high accuracy and variants of it have proven successful with high precision and recall, as described in Literature Reference Nos. 4 and 5 in the List of Incorporated Literature References. Nevertheless, this approach is limited to only a handful of languages, limiting its general applicability. In addition, given that languages vary in the amount of information that can be packed into the character limit of a social media message, such as Twitter™ (e.g., Japanese vs. English), the performance of a language-based classifier is prone to vary by language. Hence, comparative research, which relies on a language-based organization classification, would need to adjust for or take into account this source of variation.

Network-based classification methods in the literature commonly use the follower network or the directed mention network. The specific metrics used in the network-based classification methods seldom surpass a basic count of followers of an account and those whom an account follows. Furthermore, bots (i.e., software applications that run automated tasks over the Internet) and inactive users are included in the classification procedures, which could potentially result in inaccurate classifications. Previous network-based classifications (see Literature Reference No. 1) did not sufficiently leverage information contained in the bi-directed network, which better approximates interactions among "real" human entities than the directed network, which also involves non-human entities including bots. This obvious omission reflects the atheoretical and exploratory nature of previous network-based classifications.

Thus, a continuing need exists for a method that focuses on bi-directed networks and that can be applied to any user regardless of language.

SUMMARY OF THE INVENTION

The present invention relates to a classification system for organization accounts in bi-directed networks and, more particularly, to a classification system for organization accounts in bi-directed networks based on network characteristics. The system comprises one or more processors and a memory having instructions such that when the instructions are executed, the one or more processors perform multiple operations. The system processes data from a social media network comprising a set of user accounts. A directed mention network, a bi-directed mention network, and a set of computer-observable network metrics are generated. A classification model is trained using the set of computer-observable network metrics and a set of ground-truth user accounts. The trained classification model is used to classify each user account in the set of user accounts as an individual account or an organization account, resulting in a set of classified user accounts.

In another aspect, the system extracts, from the user accounts, mention records having a directionality indicating which user mentioned another user. The extracted mention records are aggregated while preserving the directionality, resulting in a set of aggregated mention records. The set of aggregated mention records is used to generate the directed mention network comprising a plurality of nodes corresponding to user accounts.

In another aspect, the bi-directed mention network is extracted from the directed mention network, wherein the bi-directed mention network comprises a subset of the plurality of nodes in the directed mention network.

In another aspect, a set of directed network metrics are computed from the directed mention network, and a set of bi-directed network metrics are computed from the bi-directed mention network.

In another aspect, the bi-directed mention network comprises only pairs of user accounts, where each pair corresponds to user accounts having mention records where the users have sent a mention record to each other at least once.

In another aspect, targeted advertising is sent to each user account that was classified as an individual account.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a classification system for organization accounts in bi-directed networks and, more particularly, to a classification system for organization accounts in bi-directed networks based on network characteristics. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Following that is an introduction that provides an overview of the present invention. Finally, specific details of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully included herein. The references are cited in the application by referring to the corresponding literature reference number, as follows:

1. Wu, S., J. Hofman, W. Mason, and D. Watts. 2011. "Who Says What to Whom on Twitter." WWW 2011—Session: Diffusion.
2. Sharma N. S. Ghosh, F. Benevenuto, N. Ganguly, and K. Gummadi. 2012. "Inferring Who-is-Who in the Twitter Social Network." ACM WOSN.
3. Tavares, G. and A. Faisal. 2013. "Scaling-Laws of Human Broadcast Communication Enable Distinction between Human, Corporate and Robot Twitter Users." PLoS One.
4. De Choudhury, M. N. Diakopoulos, and M. Naaman. 2012. "Unfolding the Event Landscape of Twitter: Classification and Exploration of User Categories." ACM CSCW.
5. De Silva, L. and E. Riloff. 2014. "User Type Classification of Tweets with Implications for Event Recognition." Proceedings of the Joint Workshop on Social Dynamics and Personal Attributes in Social Media. ACL.
6. Saramaki, J., E. A. Leicht, E. Lopez, S. G. B. Roberts, F. Reed-Tsochas, and R. I. M. Dunbar. 2014. "Persistence of Social Signatures in Human Communication." Proceedings of the National Academy of Sciences.
7. Honeycutt, C. and S. Herring. 2009. "Beyond Microblogging: Conversation and Collaboration via Twitter." HICSS.
8. Brewer, D. D. 1995. "The Social Structural Basis of The Organization of Persons in Memory." Human Nature 6: 379-403.
9. DeScioli, P, and R. Kurzban. 2009. "The Alliance Hypothesis for Human Friendship." PLoS ONE, 4(6): e5802.
10. Dunbar, R. I. M. 1995. "Neocortex Size and Group Size in Primates: A Test of the Hypothesis." Journal of Human Evolution, 28: 287-296.
11. Goode, W. J. 1960. "A Theory of Role Strain." American Sociological Review, 25(4): 483-496.
12. Miller, G. 1956. "The Magical Seven Plus or Minus Two: Some Limits on Our Capacity for Processing Information." Psychological Review, 63: 81-97.
13. Roberts, S., R. 1. M. Dunbar, T. V. Pollet, and T. Kuppens. 2009. "Exploring Variation in Active Network Size: Constraints and Ego Characteristics." Social Networks, 31(2): 138-146.
14. Blau, P. 1964. Exchange and Power in Social Life. John Wiley and Sons: New York.
15. van der Maaten, L., Hinton, G. 2008. Visualizing Data using t-SNE. Journal of Machine Learning Research 9, 2579-2605.
16. Park, P., Compton, R., Lu, T-C. 2015. Network-Based Group Account Classification, Behavior-Culture Modeling, and Prediction, Lecture Notes in Computer Science Volume 9021, pp 163-172.
17. Page, L., Brin, S., Motwani, R., Winograd, T. 1999. The PageRank citation ranking: Bringing order to the Web., published as a technical report on Jan. 29, 1998 PDF

(2) Principal Aspects

The present invention has three "principal" aspects. The first is a system for classification of organization accounts in bi-directed networks. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
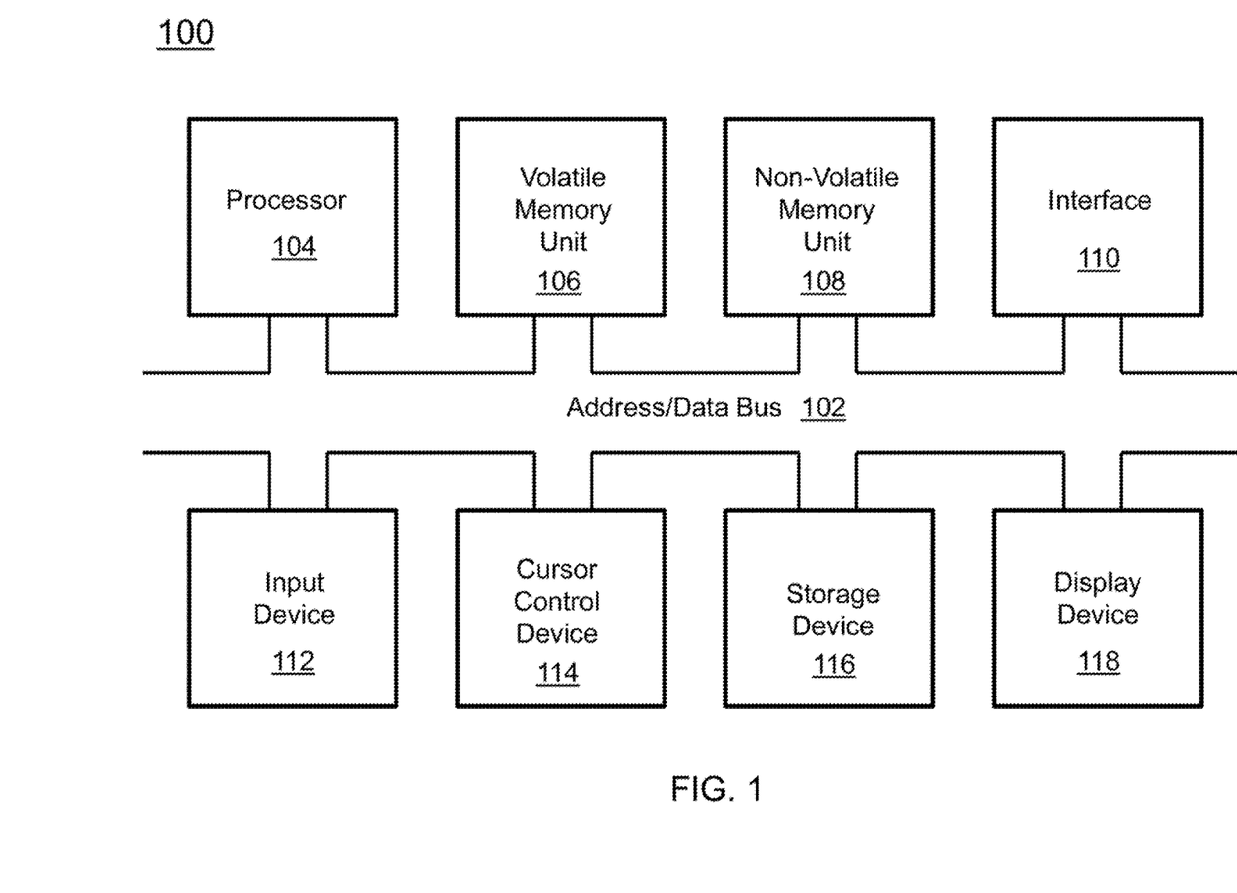
FIG. 1 is a block diagram depicting the components of a system for classification of organization accounts in bi-directed networks according to various embodiments of the present invention.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
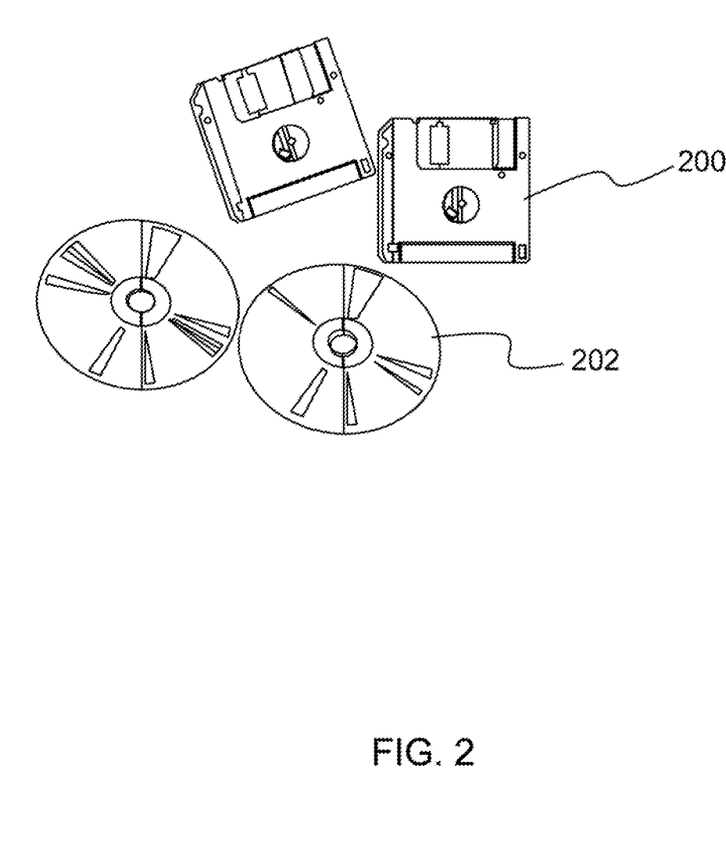
FIG. 2 is an illustration of a computer program product according to various embodiments of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

Social media platforms are amalgams of different types of users, and the behavioral patterns of each differ considerably. This enormous heterogeneity in the user population poses a considerable challenge to classification. A number of methods exist in the literature, from early attempts to identify organizations, celebrities, and media outlets using Twitter™'s "list" function (see Literature Reference Nos. 1 and 2) to those using the timing of tweeting (see Literature Reference No. 3). While language-based classification methods have been proposed and applied successfully in the past (see Literature Reference Nos. 4 and 5), the application of this type of approach is limited to the neuro-linguistic programming (NLP) infrastructure developed for each language. Side-stepping this problem, the present invention is a purely network-based classifier developed to identify groups versus individuals.

A group account in the current context is used synonymously as "managed" accounts, where more than one individual (e.g., an organization) manages a given account on a social media platform. By this definition, celebrity accounts, which are not directly managed by the individual celebrity who is linked to the account, are also group accounts. Therefore, the method according to embodiments of the present invention lumps organizations, celebrity individuals, high profile politicians, and other managed accounts into the group category. The underlying sociological, social psychological, biological, and cognitive psychological theories (see Literature Reference Nos. 6 and 8-13) behind the present invention are that due to time, cognitive, and resource constraints, individual accounts should exhibit more constrained and concentrated communication with few individuals while only communicating with the majority of other contacts intermittently. These constraints affect the ways in which individuals perceive and construct social ties. An individual has only 24 hours in each day in which to participate in social media, whereas an organization will have multiple individuals, each with 24 hours to work with. For instance, a news media organization has multiple individuals working shifts; therefore, a social media account for the organization would be far more active than that of an individual. The same applies for cognitive and resource constraints. These widely documented effects of limited attention are applied on social interaction to classify organization accounts on Twitter™.

Figure 3:
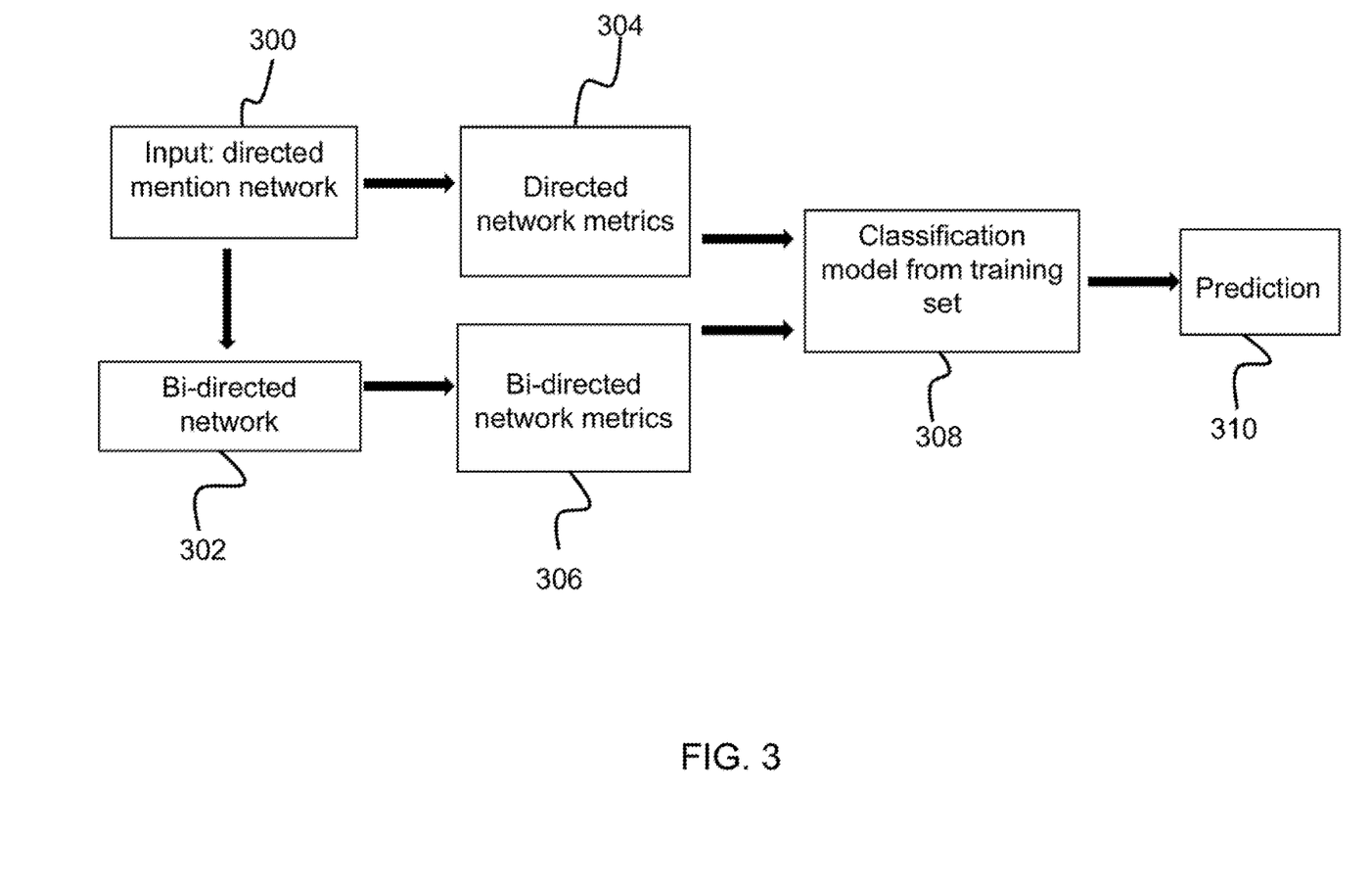
FIG. 3 is a flow diagram illustrating a system for network-based classification according to various embodiments of the present invention.
Figure 7:
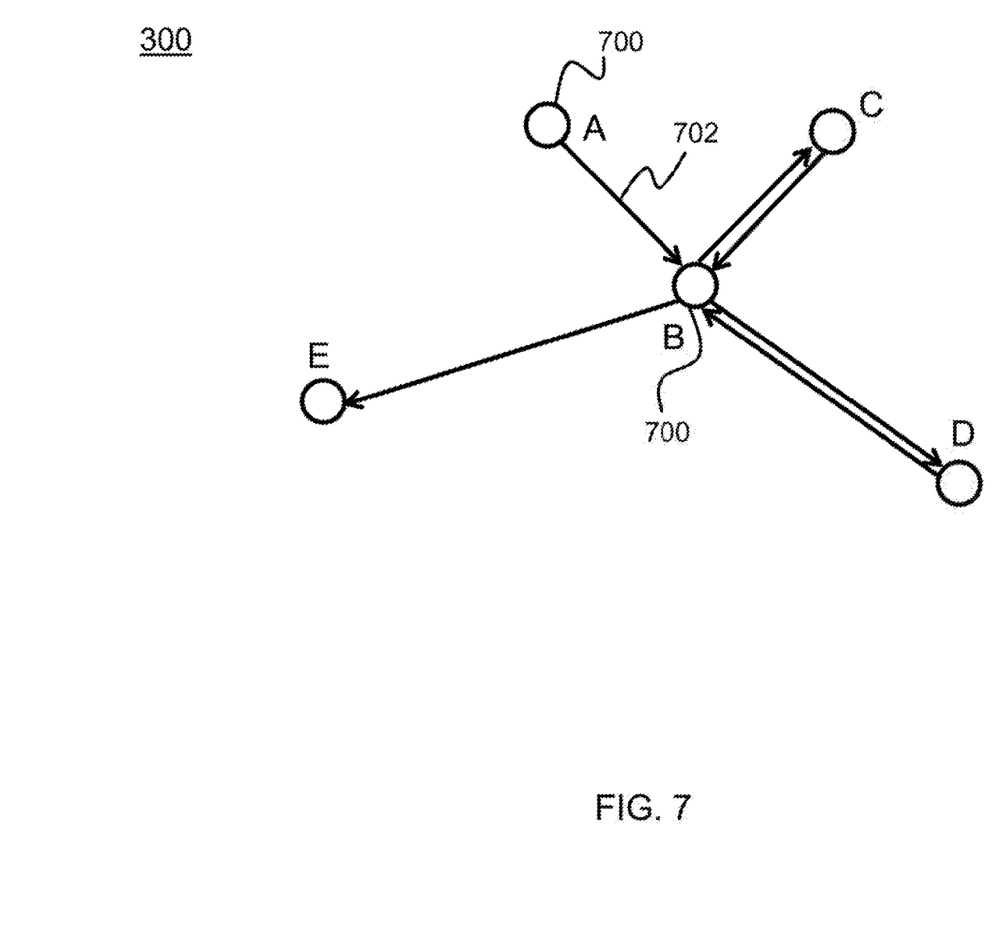
FIG. 7 is an illustration of a directed mention network according to various embodiments of the present invention.

Described is a classification method for organization vs. individual accounts on social media platforms, such as Twitter™, which is based solely on communication network characteristics of the accounts to be classified. While references to Twitter™ and tweets (i.e., messages on Twitter™) are used throughout, it can be appreciated by one skilled in the art that Twitter™ is provided only as a non-limiting example of a social media platform and is not limited thereto. Recent research demonstrates humans exhibit a skewed distribution of communication volume and frequency across their network neighbors due to time and resource constraints (see Literature Reference No. 6). Assuming that organization accounts, which usually employ staff dedicated to the maintenance of social media accounts, are relatively free from those constraints, the distribution of mentions (e.g., @mention) from and to organizations should be less skewed compared to individuals. The method described in detail below incorporates this assumption in the classification model according to embodiments of the present invention. Time, cognitive, and social role constraints limit the extent to which individuals can maintain social ties. These constraints are expressed in computer-observable network metrics at the node (i.e., account) level which are identified and exploited for inferring group accounts (4) Specific Details of the Invention (4.1) Network Construction FIG. 3 shows the overall framework of the method according to various embodiments of the present invention. The procedure starts by extracting the mentions among social media (e.g., Twitter™) accounts. @mention records are then aggregated while preserving directionality (e.g., A mentions B X times). This information is used to construct a weighted, directed mention network 300 from which a host of measures are computed, as described below. FIG. 7 illustrates an example of a directed mention network 300. As shown in FIG. 7, nodes 700 are user accounts (e.g., A and B), and edges 702 are the number of directed mentions from, for example, A to B.

Figure 8:
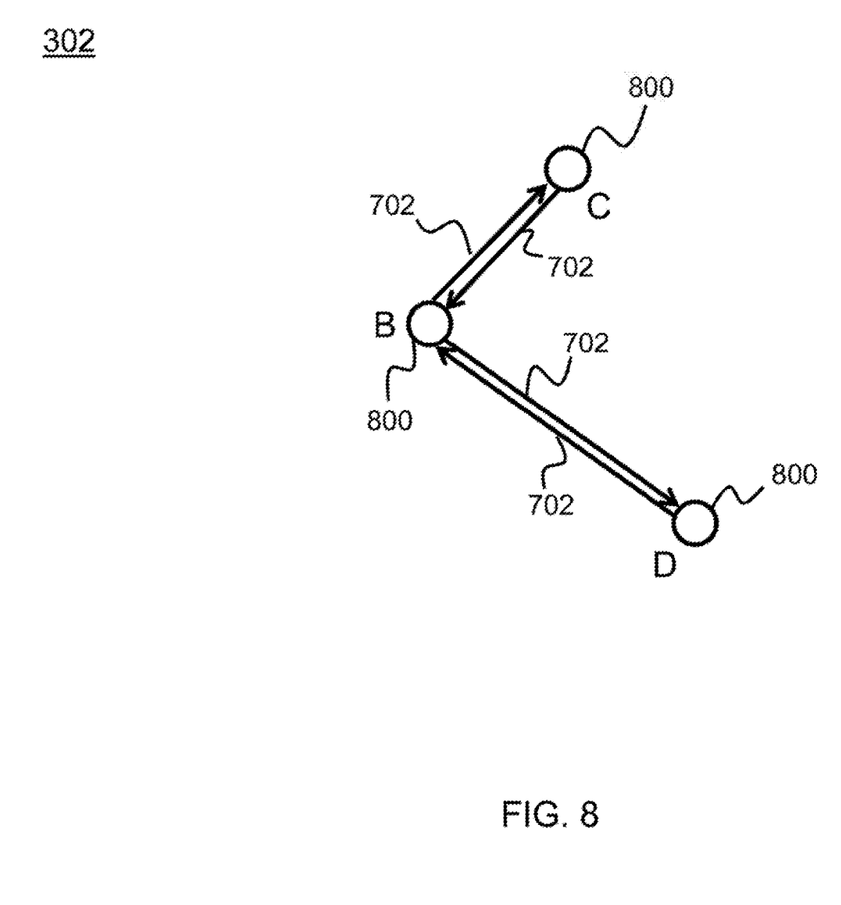
FIG. 8 is an illustration of a bi-directed mention network according to various embodiments of the present invention.

In the next step, a bi-directed mention network 302 is extracted from the directed mention network 300. The bi-directed network consists of a subset of the nodes in the directed mention network 300, where only the pairs of accounts in the directed mention network 300 are retained when both accounts sent an @mention to each other at least once. For example, if account A @mentioned account B, but B never @mentioned A, the A-B tie is excluded from the bi-directed network 302. In addition, if account A has no two-way @mention relationship with any other account, account A gets excluded from the bi-directed network 302. FIG. 8 depicts an example of a bi-directed mention network 302 comprising nodes B, C, and D 800, which include edges 702 (i.e., directed mentions) between both accounts/nodes.

The bi-directed network 302 is considered as a network of meaningful social ties which can be differentiated from one-way communication between strangers (see Literature Reference No. 14). The underlying assumption is that meaningful social ties are reciprocal in nature and that reciprocity should be observed in communication among people who maintain "meaningful" social relationships. The out-mentions and in-mentions within the bi-directed network 302, therefore, indicate the breadth and depth of communication for each account with regard to their socially relevant communication partners. Each node in the bi-directed network 302 potentially has out-mentions (i.e., this account/node mentions other accounts/nodes) or in-mentions (other accounts/nodes mention this account/node). Taken together, the directed mention network 300 and bi-directed mention network 302 complement each other by enabling the measurement of total interaction and socially meaningful interaction of the users. Using the directed mention network 300 and the bi-directed mention network 302, a set of metrics are derived to be used as predictors of individual vs. group labels, which are described in detail below.

(4.2) Directed Network Measures

From the directed mention network 300, the weighted and unweighted out- and in-mention degrees are computed, depicted as directed network metrics 304 in FIG. 3. The directed network metrics 304 represent the overall spectrum of communications involving a given user account, which shows its total communication capacity, irrespective of account type (bot, spam, individual, or group) or the account type of the @mentioned account. While these directed network metrics 304 reveal the observed total amount of communications in the data and, therefore, better approximate the cognitive and social constraints, they are impure in the sense that not all incoming or out-going mentions are conversational or "social" in the Weberian sense; mere name dropping of a celebrity figure in one's tweet does not constitute a meaningful social discourse.

(4.2.1) Log (in-Degree)

From the directed network 300, the number of alters who @mentioned ego at least once are measured and the logarithm of that quantity is taken to address the heavy skew in the distribution.

(4.2.2) Log (Out-Degree to in-Degree Ratio)

Individual users tend to have a balanced ratio of out-degree to in-degree due to the combined effects of the norms of reciprocity in human interaction and the cognitive, time-bound, and social role constraints outlined above. Specifically, since an individual's out-degree has some limit due to cognitive and time constraints, her in-degree will also be somewhat limited by the norms of reciprocity. For example, if an individual receives mentions from more than 100 alters, but can maintain communication with only 10 of them, the other 90 who could not engage in conversations with the focal individual would be more likely to reduce communication and, at some point, cease mentioning that individual altogether. On the other hand, groups and celebrities may be less subject to such norms such that those who mention group accounts simply may not hold the same expectations of reciprocity as they do for individuals.

(4.2.3) Log (Out-Mention to in-Mention Ratio)

Similar to the out- to in-degree ratio, similar norms of reciprocity and constraints may apply at the mention level for individuals. It is predicted that group accounts will exhibit lower levels of out- to in-mention ratios than individuals.

(4.2.4) Gini Coefficients of Out- and in-Mention Signatures

The out-mention and in-mention distributions of each account from the directed network are extracted and their skew measured, which represents the cognitive, time, and social role constraints associated with the hierarchical structuring of one's ego network. Theory predicts that, other factors being equal, less skew should be observed in non-individual accounts as those accounts are less limited by cognitive and time constraints than individuals. The skew of an account's mention distribution can be summarized as the well-known Gini coefficient:

$$G = 1 - \frac{\sum_{i=1}^{n} f(y_i)(S_{i-1} + S_i)}{S_n},$$

where $y_i$ is the relative mention frequency of account i ($y_i < y_{i+1}$), $f(y)$ is the probability mass function, and $$S_i = \sum_{j=1}^{i} f(y_i) y_j \text{ and } S_0 = 0.$$

From the directed network 300, the weighted and unweighted out- and in-mention degrees were computed. An unweighted degree refers to the number of connected accounts to a given focal account, whereas the weighted degree refers to the total mentions directed to (out-mentions) or from (in-mentions) other accounts. For example, if account A mentioned six other accounts 20 times in total, A's unweighted out-mention degree is six and weighted out-mention degree is 20.

(4.3) Bi-Directed Network Measures

From the bi-directed network 302, the out-mention and in-mention frequencies are derived as well as the page ranks of these accounts within the bi-directed network 302 to generate bi-directed network metrics 306. The proportion of these socially meaningful interactions should be higher for real individuals than groups, and the communications directed to and from a given alter should be more balanced in individuals compared to groups/organizations. These two insights are captured in the directed mention network 300 mention to bi-directed network 302 mention frequency ratio and the bi-directed out-mention to in-mention frequency ratio, respectively.

A desirable property of these ratios is that they are less prone to differences in popularity and Twitter™ market penetration (across different countries). The following features for the final classification task were used as input to classifiers (e.g., kNN (k-nearest neighbor) and logistic regressions).

(a) Log of bi-directed network page rank;
(b) Log of directed unweighted in-degree;
(c) Log of directed out-degree to in-degree ratio;
(d) Log of directed out-mention to in-mention ratio;
(e) Log of bi-directed network alter's degree to ego's degree ratio;
(f) Log of ratio of directed in-mention to bi-directed in-mention frequencies;
(g) Square term of the log of the ratio of directed in-mention to bi-directed in-mention frequencies;
(h) Gini coefficient of the directed network out-mention signature; and
(i) Gini coefficient of the directed network in-mention signature.

The choice of classifier will depend on the desired application. The determination of what classifiers to use for what applications needs to be empirically verified against application data to pick the most effective combinations. The focus of the specific application should dictate the choice between the KNN and the logistic regression classifiers. For example, if the group account classification is used as a filtering step in a network analysis of individual Twitter™ users, the KNN classifier may be a more sensible choice, given that it is less prone to misclassifying high-degree, "influential" individuals whose presence or absence will affect the observed network structure significantly. On the other hand, if the objective is to discover as many potential group accounts as possible as an intermediate step, for example, in identifying target accounts for an advertisement campaign, the logistic regression classification may prove to be more useful.

The classifiers are trained against labeled data (ground truth of individual vs. organization accounts) and cross-validated over test data, as described below. To that end, one will have parameters for the classifiers (e.g., for logistic regression classifier, one gets coefficients). Different data is likely to lead to different coefficients; therefore, there is no need to report such coefficients. Classifiers can be combined if an application requires such a combination.

(4.3.1) Log (Page Rank)

Page rank (described in Literature Reference No. 17), which is a measure of popularity, can be a useful indicator of group accounts to the extent that groups are driven more than ordinary individuals by the pursuit of exposure and influence on Twitter™.

(4.3.2) Log (Alter's Mean Degree to Ego's Degree Ratio).

Human social networks are characterized by assortative mixing where connected individuals tend to have similar degrees (i.e., positive degree correlation). While evidence is sparse whether assortative mixing applies to group entities as well, there is reason to believe that disassortative mixing should be more prevalent for group accounts on Twitter™. Since group/organization accounts use Twitter™ primarily as a platform to engage with individual users (e.g., individual consumers) rather than with other group entities, and since groups tend to have higher degree than individual users, the ratio of the alter's (i.e., one's friends) mean degree to ego's (i.e., self) degree should be lower for group accounts compared to individual accounts. The ego's degree refers to the number of friends (connected nodes) of a self (node).

(4.3.3) Log (Directed Network in-Mention to Bi-Directed Network in-Mention Ratio)

The directed network in-mention to the bi-directed network in-mention ratio captures the extent to which the account receives interactive or conversational @mentions relative to the total one-way @mentions. A squared term in the logistic regression classifier is also added to capture possible non-linear associations.

In summary, the input to the system is social media network (e.g., Twitter™) content, including social media network user accounts and ground-truth labeling over a subset of the social media network user accounts. The output is classification of all of the social media network user accounts as an individual's account or an organization's account. As illustrated in FIG. 3, the system constructs the directed mention network 300 and the bi-directed mention network 302, which are used to compute computer-observable network metrics (directed network metrics 304 and bi-directed network metrics 306). The computer-observable metrics are content and language agnostic (i.e., only metadata). The trained classification model 308 is used to make a prediction 310 regarding new accounts and classify the accounts as organizations/groups or individuals. In experimental studies, the classifier was built upon 10% of all tweets; therefore, the trained classifier (or classification model 308) can be used to predict/classify the rest of the user accounts, if data is available, into organization or individual accounts. The classification model 308 can also be applied to newly created Twitter™ accounts after they have started making connections in the social media network.

(4.4) Experimental Studies

Using these predictors (i.e., directed network metrics 304 and bi-directed network metrics 306), a "ground truth" dataset obtained from the Open Source Indicators (OSI) program, which contains labels of individual and organization tweets, was trained to generate a classification model 308. The Twitter™ data was cross-referenced to identify the user IDs of the labeled tweets in this dataset for the final training dataset which consisted of 156 organization accounts and 222,302 individual accounts.

Figure 4:
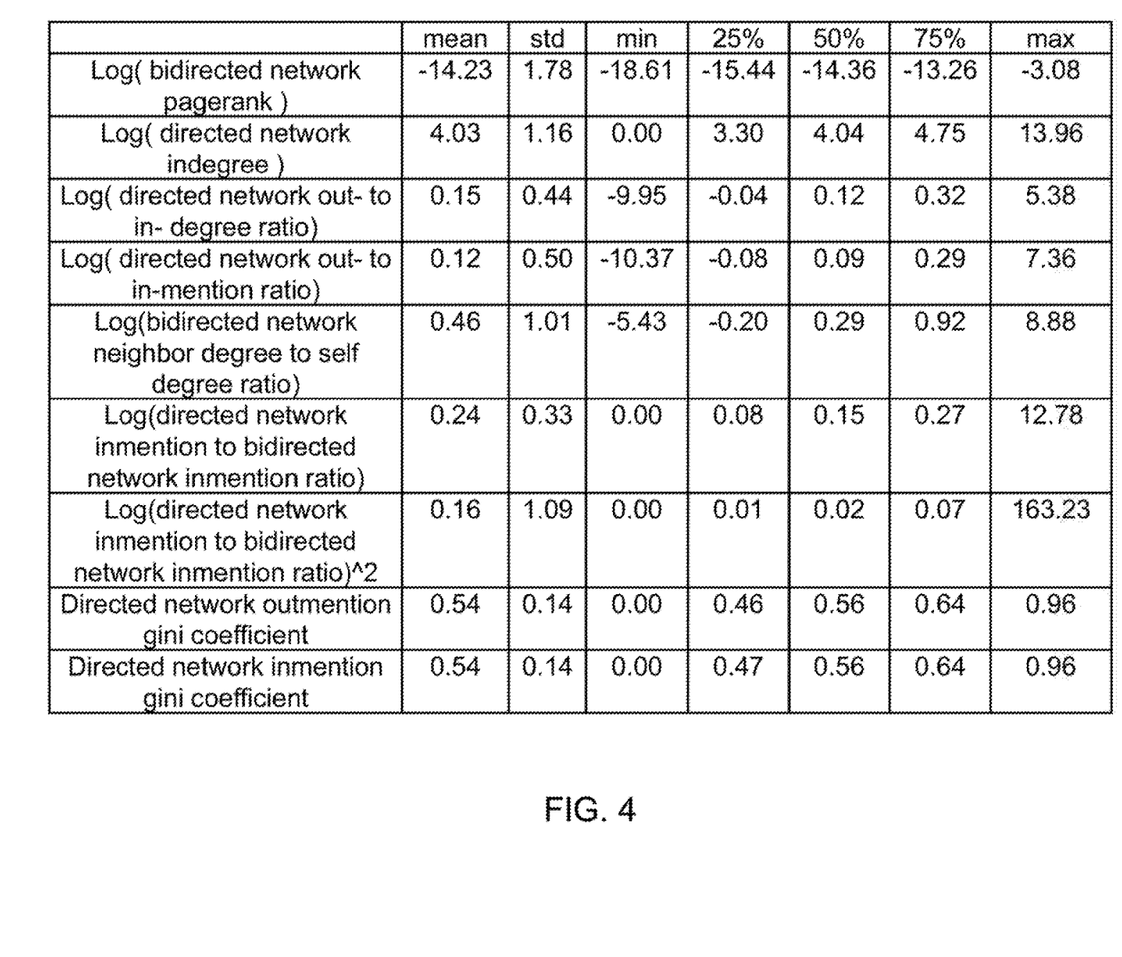
FIG. 4 is a table illustrating descriptive statistics of a training set according to various embodiments of the present invention.

FIG. 4 depicts a table showing the descriptive statistics of the ground-truth training dataset. Using the network predictors with the ground-truth labels, K-nearest neighbor (k-NN) and logistic regression classifiers were trained. 80% of the labels were used for training and the other 20% for evaluation, reflecting the imbalance between group and individual labels. Each classifier was run over 30 iterations, and overall performance was reported using three-fold cross validation.

Figure 5:
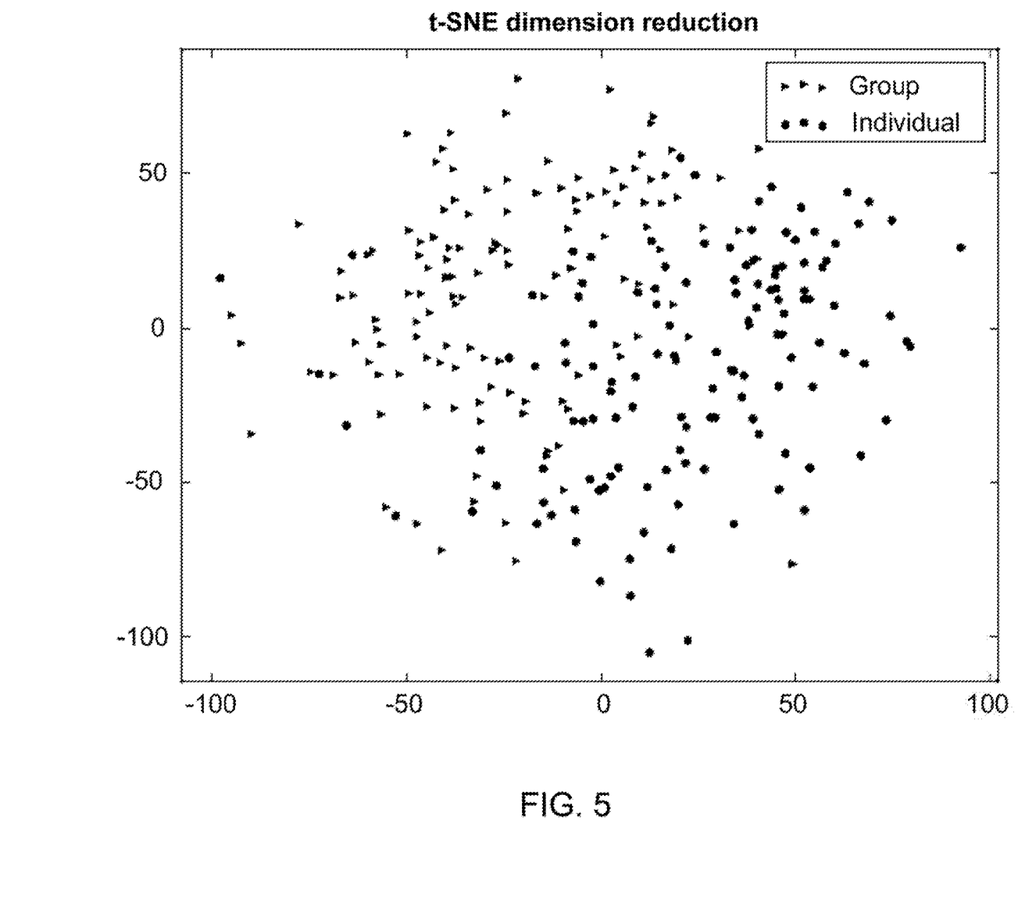
FIG. 5 is a plot chart illustrating a sample of ground-truth labels plotted using t-Distributed Stochastic Neighbor Embedding (t-SNE) dimension reduction according to various embodiments of the present invention.

FIG. 5 is a plot depicting a sample of ground-truth labels plotted using t-Distributed Stochastic Neighbor Embedding (t-SNE) dimension reduction (as described in Literature Reference No. 15) comparing organization/group accounts and individual accounts. The t-SNE algorithm maps pairwise distances in the high-dimensional space to distances in a low-dimensional embedding by equating "distance" with a joint probability and learning low-dimensional joint probabilities which are close (in the sense of Kullback-Leibler divergence) to the high-dimensional joint probabilities. Since 99% of the training data are individuals, a subset of individuals (the same as the number of group accounts) was randomly selected before visualization. Concentration of group labels (represented by triangles) in the upper left side of the plot and individual labels (represented by circles) in the lower right side of the plot suggest reasonable discriminatory power.

Figure 6:
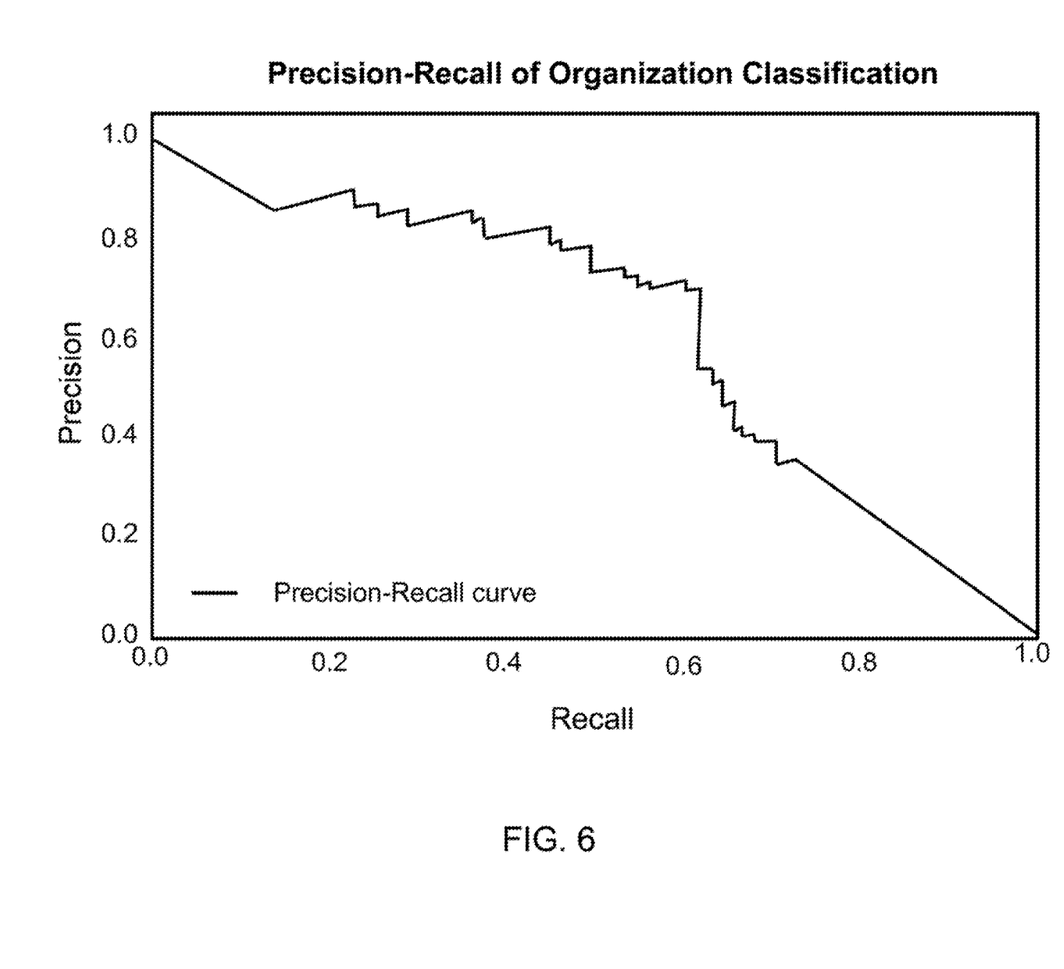
FIG. 6 is a plot chart illustrating precision-recall tradeoff of organization classification according to various embodiments of the present invention.

The classifier also shows reasonable performance in terms of precision and recall, as depicted in the plot of precision-recall tradeoff in FIG. 6. Note that relatively better precision is achieved across a wide range of recall values. This suggests that the classifier does better at reducing false positives than false negatives.

The present invention can be applied to social media related programs in addition to commercial programs. For example, this technology can be used to distinguish online social communication emitted by individuals or organizations. Similarly, the technology can be applied to identify potential buyers or special interest groups for green technology enabled vehicles. To apply the method described herein, one can start with identifying as many groups as possible, and then classifying groups by topics (e.g., product-related mentions, technology-related mentions, issue-related mentions) in their Tweet™ contents. Classified individual user accounts enable targeted advertisement or various behavior profiling (e.g., how influential an individual account is from its position in an @mention network structure (social relations aspect); how often an individual account Tweet™ (time aspect); where an individual account Tweets™ (geo-spatial aspect), and the combination thereof. Non-limiting examples of targeted advertising include supply chain management optimization and ensuring that advertisements go to the right user account (e.g., provide grocery shopping discounts to individuals and heavy construction discounts to organizations). Classified organization accounts can enable better monitoring of news or policy broadcasts from organizations.

Further, the classified user accounts can be used in surveillance applications. For instance, for civil unrest, the scale and severity of a potential protest might be greater if it is organized by an organization rather than an individual.

What is claimed is:

1. A system for network-based organization classification, the system comprising:
   one or more processors and a non-transitory memory having instructions encoded thereon such that when the instructions are executed, the one or more processors perform operations of:
     processing data from a social media network comprising a set of user accounts;
     generating a directed mention network;
     generating a set of directed network metrics from the directed mention network;

extracting a bi-directed mention network from the directed mention network, wherein the bi-directed mention network comprises only pairs of user accounts from the directed mention network that sent a mention record to each other at least once;

generating a set of bi-directed network metrics from the bi-directed mention network, where in generating the set of bi-directed network metrics, out-mention and in-mention frequencies within the bi-directed network are derived, wherein an out-mention is a mention record directed to another user account, and an in-mention is a mention record directed from another user account;

determining a directed mention network mention to bi-directed network mention frequency ratio;

training a classification model using the set of directed network metrics, the set of bi-directed network metrics, and a set of ground-truth user accounts;

classifying, using the trained classification model, each user account in the set of user accounts as an individual account or an organization account, resulting in a set of classified user accounts; and generating and pushing targeted advertisements over the social media network to classified individual user accounts.

2. The system as set forth in claim 1, wherein the one or more processors further perform operations of:

extracting, from the user accounts, mention records having a directionality indicating which user mentioned another user;

aggregating the extracted mention records while preserving the directionality, resulting in a set of aggregated mention records; and using the set of aggregated mention records to generate the directed mention network comprising a plurality of nodes corresponding to user accounts.

3. The system as set forth in claim 2, wherein the bi-directed mention network comprises a subset of the plurality of nodes in the directed mention network.

4. The system as set forth in claim 1, wherein the one or more processors further perform an operation of determining a bi-directed out-mention to in-mention frequency ratio.

5. A computer-implemented method for network-based organization classification, comprising an act of:

causing one or more processors to execute instructions stored on a non-transitory memory such that upon execution, the one or more processors perform operations of:

processing data from a social media network comprising a set of user accounts;

generating a directed mention network;

generating a set of directed network metrics from the directed mention network;

extracting a bi-directed mention network from the directed mention network, wherein the bi-directed mention network comprises only pairs of user accounts from the directed mention network that sent a mention record to each other at least once;

generating a set of bi-directed network metrics from the bi-directed mention network, where in generating the set of bi-directed network metrics, out-mention and in-mention frequencies within the bi-directed network are derived, wherein an out-mention is a mention record directed to another user account, and an in-mention is a mention record directed from another user account;

determining a directed mention network mention to bi-directed network mention frequency ratio;

training a classification model using the set of directed network metrics, the set of bi-directed network metrics, and a set of ground-truth user accounts;

classifying, using the trained classification model, each user account in the set of user accounts as an individual account or an organization account, resulting in a set of classified user accounts; and generating and pushing targeted advertisements over the social media network to classified individual user accounts.

6. The method as set forth in claim 5, wherein the one or more processors further perform operations of:

extracting, from the user accounts, mention records having a directionality indicating which user mentioned another user;

aggregating the extracted mention records while preserving the directionality, resulting in a set of aggregated mention records; and using the set of aggregated mention records to generate the directed mention network comprising a plurality of nodes corresponding to user accounts.

7. The method as set forth in claim 6, wherein the bi-directed mention network comprises a subset of the plurality of nodes in the directed mention network.

8. The method as set forth in claim 5, wherein the one or more processors further perform an operation of determining a bi-directed out-mention to in-mention frequency ratio.

9. A computer program product for network-based organization classification, the computer program product comprising:

computer-readable instructions stored on a non-transitory computer-readable medium that are executable by a computer having one or more processors for causing the processor to perform operations of:

processing data from a social media network comprising a set of user accounts;

generating a directed mention network;

generating a set of directed network metrics from the directed mention network;

extracting a bi-directed mention network from the directed mention network, wherein the bi-directed mention network comprises only pairs of user accounts from the directed mention network that sent a mention record to each other at least once;

generating a set of bi-directed network metrics from the bi-directed mention network, where in generating the set of bi-directed network metrics, out-mention and in-mention frequencies within the bi-directed network are derived, wherein an out-mention is a mention record directed to another user account, and an in-mention is a mention record directed from another user account;

determining a directed mention network mention to bi-directed network mention frequency ratio;

training a classification model using the set of directed network metrics, the set of bi-directed network metrics, and a set of ground-truth user accounts;

classifying, using the trained classification model, each user account in the set of user accounts as an individual account or an organization account, resulting in a set of classified user accounts; and generating and pushing targeted advertisements over the social media network to classified individual user accounts.

10. The computer program product as set forth in claim 9, further comprising instructions for causing the one or more processors to perform operations of:
- extracting, from the user accounts, mention records having a directionality indicating which user mentioned another user;
- aggregating the extracted mention records while preserving the directionality, resulting in a set of aggregated mention records; and
- using the set of aggregated mention records to generate the directed mention network comprising a plurality of nodes corresponding to user accounts.

11. The computer program product as set forth in claim 10, wherein the bi-directed mention network comprises a subset of the plurality of nodes in the directed mention network.

12. The computer program product as set forth in claim 9, wherein the one or more processors further perform an operation of determining a bi-directed out-mention to in-mention frequency ratio.

* * * * *